US007605203B2

(12) United States Patent
Feng et al.

(10) Patent No.: US 7,605,203 B2
(45) Date of Patent: Oct. 20, 2009

(54) POLYMER COMPOSITIONS AND ADHESIVES, COATINGS, AND SEALANTS MADE THEREFROM

(75) Inventors: Ta-Min Feng, Hudson, OH (US); Steve S. Mishra, Pepper Pike, OH (US)

(73) Assignee: Tremco Incorporated, Beachwood, OH (US)

( * ) Notice: Subject to any disclaimer, the term of this patent is extended or adjusted under 35 U.S.C. 154(b) by 515 days.

(21) Appl. No.: 11/138,730

(22) Filed: May 26, 2005

(65) Prior Publication Data

US 2006/0270770 A1 Nov. 30, 2006

(51) Int. Cl.
*C08K 5/54* (2006.01)
(52) U.S. Cl. ............... 524/268; 524/500; 524/506; 524/588
(58) Field of Classification Search ............. 524/268, 524/500, 506, 588
See application file for complete search history.

(56) References Cited

U.S. PATENT DOCUMENTS

| 3,382,205 | A | 5/1968 | Beers et al. |
| 3,727,722 | A | 12/1971 | Seiter |
| 3,632,557 | A | 1/1972 | Brode et al. |
| 3,957,714 | A | 5/1976 | Clark et al. |
| 3,979,344 | A | 9/1976 | Bryant et al. |
| 4,222,925 | A | 9/1980 | Bryant et al. |
| 4,247,445 | A | 1/1981 | Smith, Jr. et al. |
| 4,293,616 | A | 10/1981 | Smith, Jr. et al. |
| 4,345,053 | A | 8/1982 | Rizk et al. |
| 4,395,526 | A | 7/1983 | White et al. |
| 4,433,127 | A | 2/1984 | Sugiyama et al. |
| 4,496,696 | A | 1/1985 | Kurita |
| 4,546,017 | A | 10/1985 | Flackett et al. |
| 4,618,646 | A | 10/1986 | Takago et al. |
| 4,684,538 | A | 8/1987 | Klemarczyk |
| 4,902,767 | A | 2/1990 | Roitman |
| 4,931,485 | A | 6/1990 | Inoue et al. |
| 4,968,760 | A | 11/1990 | Schiller et al. |
| 5,091,445 | A | 2/1992 | Revis |
| 5,120,810 | A | 6/1992 | Fujiki et al. |
| 5,126,171 | A | 6/1992 | Katsuno et al. |
| 5,128,394 | A | 7/1992 | Traver et al. |
| 5,162,407 | A | 11/1992 | Turner |
| 5,326,845 | A | 7/1994 | Linden |
| 5,338,574 | A | 8/1994 | O'Neil et al. |
| 5,357,025 | A | 10/1994 | Altes et al. |
| 5,614,604 | A | 3/1997 | Krafcik |
| 5,714,563 | A | 2/1998 | DePompei et al. |
| 5,747,567 | A | 5/1998 | Traver et al. |
| 5,777,059 | A | 7/1998 | Datz-Siegel et al. |
| 5,840,800 | A | 11/1998 | Joffre et al. |
| 5,866,651 | A | 2/1999 | Moren et al. |
| 5,902,847 | A | 5/1999 | Yanagi et al. |
| 6,037,008 | A | 3/2000 | Huang et al. |
| 6,040,412 | A | 3/2000 | Damme et al. |
| 6,197,912 | B1 | 3/2001 | Huang et al. |
| 6,214,450 | B1 | 4/2001 | Wickert et al. |
| 6,294,620 | B1 | 9/2001 | Huang et al. |
| 6,306,999 | B1 | 10/2001 | Ozai et al. |
| 6,323,273 | B1 | 11/2001 | Mahmud et al. |
| 5,395,856 | A1 | 5/2002 | Petty et al. |
| 6,403,711 | B1 | 6/2002 | Yang et al. |
| 6,451,440 | B2 | 9/2002 | Atwood et al. |
| 6,545,104 | B1 | 4/2003 | Mueller et al. |
| 6,552,118 | B2 * | 4/2003 | Fujita et al. ............... 524/588 |
| 6,602,964 | B2 | 8/2003 | Huang et al. |
| 6,759,094 | B2 | 7/2004 | Herzig et al. |
| 6,780,926 | B2 | 8/2004 | Leempoel et al. |
| 2004/0082735 | A1 | 4/2004 | Yeats et al. |

FOREIGN PATENT DOCUMENTS

| EP | 0604815 | 12/1993 |
| EP | 0 604 851 A1 | 7/1994 |
| EP | 0 731 143 B1 | 9/1996 |
| EP | 1 153 084 B1 | 8/2000 |
| EP | 1 063 270 A2 | 12/2000 |
| EP | 00229490 | 8/2008 |
| JP | 62135560 | 6/1987 |
| JP | 03210367 | 9/1991 |
| JP | 06256620 | 9/1994 |
| JP | 2000336310 | 5/2000 |
| JP | 2003268229 | 9/2003 |
| WO | WO 00/47680 | 8/2000 |
| WO | WO 2005/087865 | 9/2005 |
| WO | 2006/002425 | 1/2006 |

OTHER PUBLICATIONS

Beers, M. Dale, et al., "Silicones," ASM Int'l. Engineered Materials Handbook, 1990, pp. 215-221, vol. 3.

(Continued)

*Primary Examiner*—Edward J Cain
(74) *Attorney, Agent, or Firm*—Calfee, Halter & Griswold, LLP

(57) ABSTRACT

Polymer compositions for preparing sealants, adhesives and coatings are provided. The polymer compositions comprise from 1 to 99% by weight of an organic polymer comprising functional silane groups, from 1 to 45% by weight (based on total polymer) of at least one reactive or non-reactive organopolysiloxane polymer; from 0 to 98% by weight (based on total polymer) of an organic polymer that lacks functional silane groups.

33 Claims, No Drawings

OTHER PUBLICATIONS

Derwent patent search results (18) for "general electric and silicone and paint," Jul. 9, 2001, http://www.delphion.com/cgi-bin/patsearch.

MicroPatent patent search results (13) for "silicone and paint and general electric, EP, WO, JP, 1995-2001," Jul. 9, 2001, http://www.micropat.com/cgi-bin/psssearch.

MicroPatent patent search results (39) for "paint and silicone and general electric, US, EP, WO, JP, 1995-2001," Jul. 9, 2001, http://www.micropat.com/cgi-bin/psssearch.

MicroPatent patent search results (61) for "silic and paint and general electric, EP, WO, JP, 1995-2001," Jul. 9, 2001, http://www.micropat.com/cgi-bin/pslist.

MicroPatent search results (1 JP Abstract) for "solventless primer composition and general electric, EP, WO, JP, 1995-2001," Jul. 9, 2001, http://www.micropat.com/cgi-bin/pslist.

Concept Query patent search results (25) for "The present invention pertains to moisture curable sealant compositions based on alkoxysilane . . . , US, Jan. 1, 1971-Mar. 27, 2001," http://mapit.mnis.net/LIVE/pl/mapit.cgi.

Page 8, Office Action dated Jun. 06, 2006, Giving Examiner's reasons for allowable subject matter in commonly assigned U.S. Appl. No. 10/874,512.

International Search Report and Written Opinion from PCT/US05/22782 mailed Oct. 20, 2006.

Office action from U.S. Appl. No. 10/874,512, mailed Jun. 5, 2006.

Amendment from U.S. Appl. No. 10/874,512, dated Dec. 5, 2006.

Office action from U.S. Appl. No. 10/874,512, mailed Mar. 7, 2007.

Amendment from U.S. Serial No. 10/874,512, dated Aug. 10, 2007.

Supplemental Amendment from U.S. Appl. No. 10/874,512, dated Oct. 25, 2007.

Notice of Allowance from U.S. Appl. No. 10/874,512, mailed Nov. 13, 2007.

Comments on Statement of REasons for Allowance from U.S. Appl. No. 10/874,512, dated Nov. 29, 2007.

\* cited by examiner

POLYMER COMPOSITIONS AND ADHESIVES, COATINGS, AND SEALANTS MADE THEREFROM

FIELD OF THE INVENTION

The present invention relates to new polymer compositions for preparing high performance adhesives, coatings, extrusions, and sealants.

BACKGROUND

High performance adhesives, coatings, extrusions, and sealants typically have been based on organic polymer compositions or compositions comprising a silicone polymer. Products based on organic polymers tend to have lower weather stability than products based on silicone polymers. Products based on silicone polymers typically have a higher affinity for dirt pickup and staining than products based on organic polymers. The latter also tend to have relatively poor adhesion to certain substrates and are difficult to paint. Organic polymers and silicone polymers are immiscible and, as a result, blends combining these two types of polymers phase separate. There is a need for new polymer compositions for producing adhesives, coatings and sealants.

SUMMARY OF THE INVENTION

Provided herein are polymer compositions for preparing sealants, coatings, adhesives, and extrusions with improved weather stability and/or performance The polymer compositions of the present invention comprise from 1% to 99% by weight (of polymer) of an organic polymer (referred to hereinafter as a "compatibilizer") that comprises silane groups, from 1% to 45% by weight (of polymer) of a reactive or non-reactive organopolysiloxane polymer, and from 0% to 98% by weight (of polymer) of an organic polymer that does not comprise silane groups. In certain embodiments, the compatibilizer is an organic polymer that is partially or fully end-capped with silane groups. The present polymer compositions are based, at least in part, on the inventors' discovery that sealants based on polymer compositions that comprise both a silicone polymer and an organic polymer that comprises silane groups do not phase separate as readily as compositions lacking the present compatibilizer.

Upon cure, the present polymer compositions can be used as coatings, sealants, or adhesives. The present polymer compositions may further comprise other additives to modify the properties of such coatings, sealants, and adhesives.

The present sealant, adhesive, and coating compositions may be 1-part curable compositions or 2-part curable compositions. The present sealant, adhesive, and coating compositions may be either thermally curing systems or room temperature curing systems. The present sealant compositions may be extrusion or in situ cured systems.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE INVENTION

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Polymer Compositions

The polymer compositions of the present invention are comprised of 1% to 99% by weight of at least one organic polymer that comprises silane groups, i.e., a compatibilizer, and from 1% to 45% by weight of at least one reactive or non-reactive organopolysiloxane polymer, preferably a reactive organopolysiloxane. In certain embodiments, the silane groups are end-cappers, i.e., the compatibilizer is partially or fully end-capped with silane groups. In other embodiments, the silane groups are incorporated into the backbone of the compatibilizer or are pendant groups, i.e., are attached to the backbone of the compatibilizer. The compatibilizers used in the present compositions have a molecular weight greater than 1000 g/mole, preferably greater than 10,000 g/mole. The present polymer compositions also comprise from 0% to 98% by weight of an organic polymer that does not comprise silane groups.

Both the compatibilizer and the organic polymer that does not comprise silane groups can be a homopolymer, a copolymer, a multipolymer, or any mixture thereof. The compatibilizer and the organic polymer that lacks silane groups can be chosen from aromatic and aliphatic urethane polymers, polyethers, polyesters, acrylic polymers, polystyrene, styrene butadiene polymers, polybutadiene, and butyl rubber, and any mixture or blend thereof. The organic polymers used in the present compositions may have different backbones such as polyester, polyether, polyacrylate, polybutadiene, polycarbonate or any mixture of such backbones. Furthermore, the organic polymers used in the present compositions could also have other functional groups, such as acrylates, amides, maleic anhydride, and so forth, attached thereto.

In certain embodiments of the present polymer composition, at least one of the compatibilizers is an aromatic or aliphatic polyurethane polymer that is partially or fully end-capped with silane groups In certain embodiments, at least one of the compatibilizers is a polyurethane polymer that is end capped with silane groups and other end-cappers. Examples of other suitable end-cappers include but are not limited to alcohols, and monomers or polymers containing epoxy, hydroxy, and mercapto functional groups, or any combination thereof. The silane end-capped polyurethane polymer may be derived by the steps of a) reacting a diisocyanate compound with a polyol to form an intermediate, wherein the intermediate is selected from isocyanates or hydroxyl terminated polyurethane prepolymers; and b) silylating the intermediate. Preferably, the intermediate is silylated with an organo functional silane having one or more hydrolyzable groups.

Suitable hydroxy-terminated polymeric materials for preparing the polyurethane polymers include, but are not limited to di, tri, and tetra functional polyols, including polyether polyols, polyester polyols, acrylic polyols, and polyols comprising two or more hydroxyl groups and a straight or branched chain hydrocarbon.

Suitable polyether diols and triols include polyethylene ether diols or triols, polypropylene ether diols or triols, polybutylene ether diols or triols, polytetramethylene ether diols or triols, and block copolymers of such diols and triols.

Suitable hydroxy-terminated polyesters include any hydroxy-terminated polyester prepared from poly-basic acids or anhydrides (for example, adipic acid and phthalic anhydride) and polyols in which the hydroxyl functionality of the polyester prepolymer is greater than 2, preferably over 2.3. Polylactone containing hydroxyl groups are also suitable for making the prepolymer, particularly polycaprolactone diol and triol.

Suitable acrylic polyols include hydroxyl-terminated polyacrylate. Acrylates include, but are not limited to, butylacrylate, methylacrylate, methylmethacrylate, ethyl acrylate, 2-ethylhexyl acrylate or the mixture of above. Suitable polyols comprising two or more hydroxyl groups and a straight or branched hydrocarbon chain include hydroxyl functionalized polybutadiene. Other suitable polyols include polycarbonates having hydroxyl groups.

Preferably, the polyol has a number average molecular weight of from 500 to 18,000. For polymers that are used to make sealant compositions, it is preferred that the polyol have a number average molecular weight of from 2,000 to 8,000. For polymers that are used to make coating or adhesive compositions, it is preferred that the polyol have a number average molecular weight of from 500 to 4000.

The isocyanates that are reacted with the hydroxy-terminated backbone polymer are organic isocyanates having 1 or more isocyanate groups or a mixture of such organic isocyanates. The isocyanates are aromatic or, preferably, aliphatic isocyanates. Examples of suitable aromatic di -or triisocyanates include p,p',p''-triisocyanato triphenyl methane, p,p'-diisocyanato diphenyl methane, naphthalene-1,5-diisocyanate, 2,4-tolylene diisocyanate, 2,6-tolylene diisocyanate, and mixtures thereof. Examples of preferred aliphatic isocyantes are isophorone diisocyanate, dicyclohexyl methane-4,4'-diisocyanate, and mixtures thereof.

The polyurethane polymer may be prepared by mixing the hydroxy-terminated polymer and organic isocyanate together at ambient temperature and pressure, although the speed of the reaction is significantly increased if the temperature of the reaction mixture is raised to a higher temperature, for example, a temperature between 60°-100° C. A stoichiometric excess of the isocyanate or polyol is used to ensure that the polyurethane polymer has NCO or OH terminal groups.

In certain embodiments, the polymer having terminal NCO groups is then reacted with silane capping agents so that 50 to 100% of the NCO groups are blocked or end-capped with silane groups. Examples of suitable silane capping agents include, but are not limited to, silanes corresponding to the formula I.

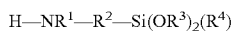

wherein $R^1$ represents hydrogen, a substituted aliphatic, cycloaliphatic, and/or aromatic hydrocarbon radical containing 1 to 10 carbon atoms, a second $-R^2-Si(OR^3)_2(R^4)$, or $-CHR^5-CHR^6COOR^7$ where $R^5$ and $R^6$ are H or $C_{1-6}$ organic moiety, and $R^7$ is $C_{1-10}$ organic moiety.

$R^2$ represents a linear or branched alkylene radical containing 1 to 8 carbon atoms.

$R^3$ represents a $C_{1-6}$ alkyl group.

$R^4=-CH_3$, $-CH_2CH_3$, or $OR^3$.

Examples of suitable aminosilanes corresponding to formula I include N-phenylaminopropyltrimethoxysilane, N-ethylaminoisobutyltrimethoxysilane, gamma-aminopropyltrimethoxysilane, gamma-aminopropyltriethoxysilane, and the reaction product of an aminosilane (such as gamma-aminopropyltrimethoxysilane, gamma-aminopropyltriethoxysilane, gamma-aminopropylmethyldimethoxysilane) with an acrylic monomer (such as ethyl acrylate, butyl acrylate, 2-ethylhexyl acrylate, methyl acrylate, methyl methacrylate, and glycidal acrylate).

Examples of other suitable silanes include mercaptosilane, the reaction product of a mercaptosilane with a monoepoxide, and the reaction product of an epoxysilane with a secondary amine and silanes with the following structure:

$OCN-R^2-Si(OR^3)_2(R^4)$, wherein $R^2$, $R^3$ and $R^4$ are as described above.

Methods of preparing polyurethane polymers, and silylated polyurethane polymers are well known in the art. See, e.g., U.S. Pat. Nos. 3,627,722, 3,632,557, 3,979,344, and 4,222,925, which are incorporated herein by reference.

In certain embodiments, the resulting partially silylated, polyurethane polymer is then combined with a sufficient amount of a non-hindered aromatic or aliphatic alcohol to block or end-cap any unreacted, i.e., non-silylated, NCO groups. Examples of suitable aliphatic alcohols include, but are not limited to, methanol, ethanol, iso-propanol, butanol. Preferably, the aromatic alcohol has a molecular weight less than 2000. Examples of suitable aromatic alcohols include phenol, 3-methoxyphenol, 4-methoxyphenol, nonylphenol, meta-cresol, para-cresol, 4-chlorophenol, meta-hydroxybenzaldehyde, ortho-hydroxybenzaldehyde, para-hydroxybenzaldehyde, hydroquinone, 1-hydroxy-2-propanone, 3-hydroxyacetophenone, and 4-hydroxyacetophenone. The polyurethane polymer that is partially end-capped with silane groups is reacted with the aromatic alcohol at 80° C. for 90 minutes to provide a composition comprising a silane and aromatic alcohol end capped, polyurethane prepolymer and an excess of aromatic alcohol.

Optionally, the polymer composition also comprises a moisture scavenger which may be added after the reaction. Examples of moisture scavengers for inclusion in the prepolymer composition are vinytrimethoxysilane, methyltrimethoxysilane, hexamethyldisilazane, paratoluene sulfonyl isocyanate (PTSI), toluene diisocyanate (TDI), diphenyl methane diisocyanate (MDI), and polymeric MDI. The moisture content of the polymer composition preferably is 0.1 to 10%, more preferably 0.2 to 3%.

In certain embodiments of the present polymer composition, at least one of the compatibilizers is a silylated allylic terminated linear or branched polyether. The polyether backbone may have other functional groups, such as acrylates, amides, maleic anhydride, and so forth. The polymers' terminal ends could be partially or fully end-capped either with silane groups or with a combination of silane groups and other end-capping groups. The silylated allylic terminated polyether is derived from the reaction of a vinyl alkyl terminated polyol with a hydride functional silane. Preferably, the hydride functional silane is selected from the group consisting of triethoxysilane, trimethoxysilane, methyldiethoxysilane, methyldimethylsilane and combinations thereof.

Another suitable compatibilizer is a reactive silylated polyol. This polyol may be selected from polyester, polyether, polyacrylate, polybutadiene, polycarbonate, and so forth. The silylation may be done as discussed above.

The compatibilizer may also be a polyether having silicone functional groups. Preferably, when the organic polymer is a polyether having a silicone functional group, the silicone functional group is a hydrolyzable silane group. Preferable polyethers having a silicone functional group are those having a molecular weight in the range from about 2,000 to about 50,000 g/mole.

The organopolysiloxane used in the present composition may be a non-reactive organopolysiloxane, i.e., a polysiloxane that contains no reactive functional groups. In other embodiments, the organopolysiloxane is a reactive organopolysiloxane that contains reactive functional groups, preferably two reactive functional groups on the polymer chain, preferably at the terminal portion thereof, i.e., preferably the reactive functional groups are end-groups. Organopolysiloxanes useful in this invention include, but are not limited to, those which contain a condensable functional group which can be an hydroxyl group, or hydrolyzable group such as a silicon-bonded alkoxy group, acyloxy group, ketoximo group, amino group, amido group, aminoxy group, an alkenoxy group, and so forth. The reactive functional groups may be hydroxyl, alkoxy, silicone alkoxy, acyloxy, ketoximo, amino, amido, aminoxy, alkenoxy, alkenyl, or enoxy groups or any combination thereof. The reactive functional groups are end groups, pendant groups, or a combination thereof. In certain embodiments, the organopolysiloxanes used in the present invention preferably have a molecular weight in the range from 20,000 to 100,000 grams/mole.

In one embodiment, the reactive organopolysiloxane polymer is of the formula:

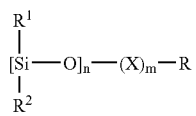

where $R^1$ and $R^2$, independently, are an alkyl having from 1 to 8 carbon atoms, desirably from 1 to 4 carbon atoms with methyl being preferred, or is an aromatic group or substituted aromatic group having from 6 to 10 carbon atoms with phenyl being preferred, and "n" is such that the weight average molecular weight of the organopolysiloxane is from about 10,000 to about 200,000 and desirably from about 20,000 to about 100,000 grams/mole. It is to be understood that the above polymers also contain, as noted above, two or more reactive functional groups (X) therein. The functional groups, independently, can be OH, or $OR^3$, or $N(R^4)_2$, enoxy, acyloxy, oximo, or aminoxy, wherein these functional groups may have substituents at any substitutable location. For example,

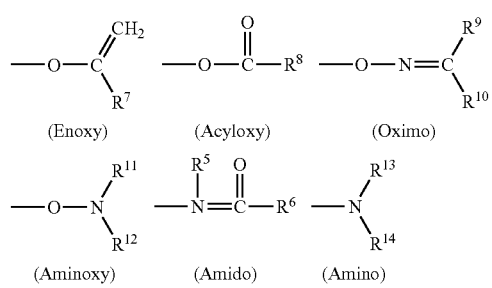

wherein $R^3$ through $R^{14}$ are, independently, an alkyl or cycloalkyl having from about 1 to about 8 carbon atoms.

In one embodiment, the reactive organopolysiloxane of the present polymer composition may be depicted as

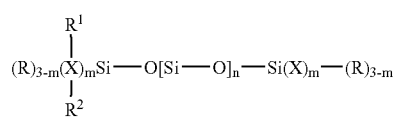

The one or more R groups, independently, is an alkyl having from 1 to 8 carbon atoms or an aromatic or an alkyl-aromatic having from 6 to 20 carbon atoms and optionally containing one or more functional groups thereon, such as amine, hydroxyl, alkene, alkoxy, and so forth. The amount of the functional groups, i.e., m, is 1, 2 or 3.

The reactive functional group (X), can be OH, or OR', or N(R'), or enoxy, or acyloxy, or oximo, or aminoxy, or amido, wherein the reactive functional group may have substitutions, R', at any substitutable C or N, and which is selected from the group consisting of an alkyl having from about 1 to about 8 carbon atoms, an aromatic, an alkyl-aromatic having from 6 to 20 carbon atoms, and wherein R' may optionally contain one or more functional groups thereon such as amine, hydroxyl, and so forth. An organopolysiloxane fluid can furthermore contain a blend of two or more different polysiloxanes and/or organopolysiloxanes having different molecular weights. The polysiloxanes are generally a viscous liquid and are commercially available from several silicone manufacturers such as Wacker Corporation, General Electric, Dow Corning and Rhone-Poulenc.

In another embodiment, the present polymer composition comprises a non-reactive organopolysiloxane, i.e., the organopolysiloxane lacks functional groups. The non-reactive organopolysiloxane may be depicted as

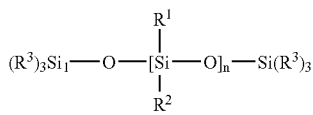

where $R^1$, $R^2$, and $R^3$ independently, are an alkyl having from 1 to 8 carbon atoms, desirably from 1 to 4 carbon atoms with methyl being preferred, or is an aromatic group or substituted aromatic group having from 6 to 10 carbon atoms with phenyl being preferred, and "n" is such that the weight average molecular weight of the organopolysiloxane is from about 100 to about 100,000 and desirably from about 3,000 to about 50,000 grams/mole.

The polymer compositions of the present invention are generally made by blending the compatibilizer, the organopolysiloxane polymer, and optionally an organic polymer that does not contain silane groups.

Adhesive, Coating and Sealant Compositions

The sealant, adhesive, and coating compositions of the present invention comprise a polymer composition of the present invention. In certain embodiments, the sealant, adhesive and coating compositions further comprise a silicone cross-linker. The silicone crosslinker used in the present adhesive, coating and sealant compositions may be selected from such crosslinkers as oximes, alkoxysilanes, epoxyalkylalkoxysilanes, amido silanes, aminosilanes, enoxysilanes, tetraethoxysilanes, methyltrimethoxysilane, vinyltrimethoxysilane, glycidoxypropyltrimethoxsilane, vinyltris-isoproprenoxysilane, methyltris-isopropenoxysilane, methyltris-cyclohexylaminosilane, methyltris-secondarybutylaminosilane, condensation cure catalysts, and combinations thereof. Preferred oxime crosslinkers include vinyltrismethylethylketoximosilane, methyltrismethylethylketoximosilane, and combinations thereof. The compatibilizer contains silyl terminal groups that can enter into a vulcanization reaction with the silicone functional crosslinking system attached to the reactive organopolysiloxane polymer. Alternatively, the compatibilizer can form an interpenetrating network with the organopolysiloxane. The sealant, coating and adhesive compositions of the present invention may also include a plasticizer, an adhesion promoter, a reinforcement agent, a rheology modifier, a chain extender, a UV stabilizer, catalyst, water scavenger, and/or surface modifier, such as wax, minifiber, glass bead, plastic bead and ceramic bead, and so forth.

The adhesive, coating and sealant compositions of the present invention generally are cured by generally subjecting them to moisture or a curative with or without heat. Either a conventional one-component or two-component cure system can be utilized. In a conventional one-component cure, the organopolysiloxane is converted to a compound having an alkoxy, an oxime, an enoxy, an amido, an amino, or an acetoxy blocking group in a manner well known to the art and to the literature. Conventional condensation catalysts may be utilized, such as an organotin, for example, dibutyltindilaurate, dibutyltindiacetate, dimethyltindi-2-ethylhexanoate, or dimethylhydroxytinoleate, or an organotitanate.

Optionally, the blocked one-component cure system can contain crosslinking agents as set forth herein. In a two-component cure system, crosslinking agents, such as a multi-functional alkoxy silane or oligomers thereof and catalysts are kept separate from the organopolysiloxane until reaction. The amount of catalyst for the two-component system is generally higher than in the one-component system. Such cure systems are well known to the art, see, e.g., Maurice Morton, et al., *Rubber Technology*, 3$^{rd}$ Ed., pp. 406-407, (1987), which is hereby fully incorporated by reference. When a two part cure is used, the two-part cure may either be a room-temperature curable or a thermally curing material.

While a variety of conventional crosslinkers are suitable, oxime and alkoxy crosslinkers are preferred, such as, for example, vinyltris-methylethylketoximosilane, and methyltris-methylethylketoximosilane, and alkoxysilanes such as methyltrimethoxysilane and vinyltrimethoxysilane. Methyltrimethoxysilane is available, for example, under the trade name A-1630 and vinyltrimethoxysilane is available, for example, under the trade name A-171 from General Electric-OSI Specialties. Methyltris-methylethylketoximosilane (MOS) is available under the trade name OS-1000, for example, and vinyl tris-methylketoximosilane under the trade name of OS-2000 by Honeywell Corporation, for example. Other crosslinkers are also suitable, such as alkoxysilanes, epoxyalkylalkoxysilanes, amidosilanes, aminosilanes, enoxysilanes and the like, as well as tetraethoxysilanes, glycidoxypropyltrimethoxsilane, vinyltris-isopropenoxysilane, methyltris-isopropenoxysilane, methyltris-cyclohexylaminosilane, and methyltris-secondarybutylaminosilane. Mixtures of crosslinkers may also be employed. The amount of the crosslinking agent is generally from about 0.2 to about 20 parts by weight, desirably from about 1 to about 10 parts by weight, and preferably from about 1.5 to about 6.5 parts by weight for every 100 parts by weight of said copolymer-organopolysiloxane. Addition cure crosslinkers may also be used in conjunction with alkenyl functional organopolysiloxane polymers. These crosslinkers may be pre-reacted to the polyorganosilane polymers.

The crosslinker is used in amounts which are conventionally used for making curable silicone elastomeric compositions. Those skilled in the art may determine the proper amounts for room-temperature curable and thermally curable crosslinkers. The amounts used will vary depending upon the particular crosslinker chosen and the properties of the cured elastomer desired, and may readily be determined by those of ordinary skill in the art.

A mixture of polyorganosiloxane and crosslinker will usually cure at room temperature when exposed to moisture, however, sometimes it is desirable to accelerate the cure rate, i.e., reduce the time to cure composition. In these situations a catalyst may be used. Preferred catalysts include metal salts of carboxylic acids such as dibutyltindilaurate, dibutyltindiacetate, dibutyltin-bis(acetylacetonate) and dimethyltindi-2-ethylhexanoate; organotitanates such as tetrabutyltitanate, tetra-n-propyltitanate, diisopropoxydi(ethoxyacetoacetyl)titanate, and bis(acetylacetonyl)diisopropyltitanate. Alternatively, thermally curable materials may be used in addition to or in place of the room-temperature curable systems.

In certain embodiments, the sealant, coating and adhesive compositions comprise a plasticizer. The plasticizer generally has a number average molecular weight of from about 100 to about 800 and desirably from about 200 to about 400. Preferably the plasticizer has a boiling point greater than about 100° C. at 1 atmospheric pressure. Suitable plasticizers are organic oils used as silicone extenders, phthalate esters, dibenezoate esters, phosphate esters, and adipate esters. Examples of organic oils used as silicone extenders include aliphatic hydrocarbon oils and aromatic hydrocarbon oils such as alkylbenzene. Examples of phthalate esters are dibutyl phthalate, dioctyl phthalate, dimethyl phthalate, diisodecyl phthalate, butyl benzyl phthalate, texanol benzyl phthalate, $C_7$ benzyl phthalate, and $C_9$ benzyl phthalate. Examples of dibenzoate esters are dipropylene glycol dibenzoate, polypropylene gylcol dibenzoate, diethylene glycol, and triethylene glycol dibenzoate. Examples of adipate esters are dioctyl adipate, ditridecyl adipate, and dialkyl adipate. Examples of phosphate esters are tricryesyl phosphate, trioctyl phosphate, triphenyl phosphate, and t-butylphenyl diphenyl phosphate. Other suitable plasticizers are for example terephthalates such as 1,4-benzenedicarboxylates, and trimelliatics such as 1,2,4-benzenedicarboxylates. A suitable butyl benzyl phthalate, a phthalate ester of butyl alcohol and benzyl alcohol, is commercially available as Santicizer 160. Optionally, an adhesion promoter may be added to the present sealant, coating, and adhesive compositions. The amount of adhesion promoter may readily be determined by those of ordinary skill in the art. The amount of the adhesion promoter in the sealant is generally from 0 to about 10, desirably from about 1 to about 8, preferably from about 2 to about 6, and more preferably from about 1.5 to about 3 parts by weight per 100 parts of organosilicone polymer.

Suitable classes of adhesion promoters are aminoalkyl, mercaptoalkyl, ureidoalkyl, carboxy, acrylate and isocyanurate functional silanes. Examples of suitable adhesion promoters are mercaptopropyltrimethoxysilane, N-ethylaminoisobutyltrimethoxysilane, glycidoxypropyltrimemethoxysilane, aminopropyltriethoxysilane, aminopropyltrimethoxysilane, aminoethylaminopropyltrimethoxysilane, ureidopropyltrimethyloxysilane, bis-γ-trimethoxysilylpropylurea, 1,3,5-tris-γ-trimethyloxysilylproplisocyanurate, bis-γ-trimethoxysilylpropylmaleate and fumarate and γ-methacryloxypropyltrimethoxysilane.

Reinforcing agents may be added to the present sealant and adhesive compositions. The amount of the reinforcing agent is generally from 0 to about 250, desirably from about 30 to about 200 parts by weight of 100 parts of the polymer.

Reinforcing agents increase tensile strength in the cured sealant and reduce sag of the uncured sealant. The reinforcing agent also functions as a thixotrope. Such reinforcing agents are finely divided particulates and include both the conventionally known reinforcing agents and semi-reinforcing agents, typically having a particle size less than about 10 microns, preferably about 5 microns or less, more preferably about 0.1 microns or less. Suitable reinforcing agents include hydrophobic treated fumed silicas, such as TS 720 from Cabot Corporation, or R-972 from Degussa Corporation, hydrophobic precipitated calcium carbonates, talc, aluminum silicate, zinc oxides, polyvinyl chloride powders, and soft acrylates such as those of U.S. Pat. No. 6,403,711B1, incorporated herein by reference. Other ingredients can also be utilized in the sealant formulation in amounts up to about 20 parts by weight and desirably from about 0.01 to about 15 parts by weight per 100 parts by weight of the copolymer and the organopolysiloxane. Such ingredients include fungicides. Moreover, extender fillers such as ground calcium carbonates and diatomaceous earth are optionally employed. Such extenders have minimal or no reinforcing effect and/or minimal or no thixotropic effect.

UV stabilizers may also optionally be added to the present sealant and adhesive compositions. Pigments or colorants such as titanium dioxide, iron oxide, carbon black are optionally employed to impart color to the sealant and/or to act as ultraviolet stabilizer. LTV inhibitors, anitozonates are also optionally added.

The sealant in its uncured state may optionally contain solvents such as organic solvents to reduce the viscosity.

Application of the Sealant and Coating Compositions

The sealant and adhesive compositions may be used to seal or bond buildings, highways, bridges, trucks, trailers, buses, recreational vehicles, cars, utilities, window applications, etc. Dissimilar materials that may, for example, be sealed or bonded with the present sealant composition include cement containing products, metals, plastics, glass, EIFS materials, vinyls, painted metals, coated glasses, Kynar, marble, granite, and brick. The sealant composition may be applied using standard equipment, such as a caulking gun or pump.

The coating composition may be applied to a surface by spraying or poured onto the surface and spread across the surface with a roller or other similar device.

EXAMPLES

The following compositions can be compounded using conventional mixing equipment such as a twin screw extruder or a change can mixer.

Example 1

|  | Weight, % |
|---|---|
| 1. Silane and aromatic alcohol endcapped polyurethane polymer | 27.86 |
| 2. 80,000 cps. silanol terminated dimethylpolysiloxane | 5 |
| 3. 20,000 cps. silanol terminated dimethylpolysiloxane | 5 |
| 4. Organic plasticizer | 9 |
| 5. White tint paste | 6.5 |
| 6. Coated precipitated calcium carbonate | 41 |
| 7. Rheology control agent | 0.5 |
| 8. Fume silica | 0.5 |
| 9. UV stabilizer | 0.4 |
| 10. Hexamethyldisilazane | 1 |
| 11 Vinyltrimethoxysilane | 1 |
| 12. Methyltris-methylethylketoximosilane | 0.8 |
| 13. Vinylltris-methylethylketoximosilane | 0.8 |
| 14. Aminopropyltrimethoxysilane | 0.1 |
| 15. N-ethylaminoisobutyltrimethoxysilane | 0.5 |
| 16. Dibutyltin diacetate | 0.04 |

In this example, about 26% (by weight, based on total polymer) of silicone polymer was used to prepare a medium modulus sealant. The organic polymer comprised a silane and aromatic alcohol endcapped polyurethane polymer. The composition upon curing had a tack free time of 180 minutes accompanied by a tooling time of 60 minutes with a shore A hardness of about 20. The sealant underwent more than 10,000 hours of weathering test in Xenon Arc weatherometer without any observable surface changes taking place.

Example 2

|  | Weight, % |
|---|---|
| 1. Silane and aromatic alcohol endcapped polyurethane polymer | 27.86 |
| 2. 80,000 cps. silanol terminated dimethylpolysiloxane | 10 |
| 3. 20,000 cps. silanol terminated dimethylpolysiloxane | 10 |
| 4. White tint paste | 6.5 |
| 5. Coated precipitated calcium carbonate | 40 |
| 6. Rheology control agent | 0.5 |
| 7. Fume silica | 0.5 |
| 8. UV stabilizer | 0.4 |
| 9. Hexamethyldisilazane | 1 |

-continued

| | Weight, % |
|---|---|
| 10. Vinyltrimethoxysilane | 1 |
| 11. Methyltris-methylethylketoximosilane | 0.8 |
| 12. Vinylltris-methylethylketoximosilane | 0.8 |
| 13. Aminopropyltrimethoxysilane | 0.1 |
| 14. N-ethylaminoisobutyltrimethoxysilane | 0.5 |
| 15. Dibutyltin diacetate | 0.04 |

In this example, about 42% (by weight, based on total polymer) of silicone polymer was used to prepare a faster cure sealant. The organic polymer comprised a silane and aromatic alcohol endcapped polyurethane polymer. The composition upon curing had a tack free time of 100 minutes accompanied by a tooling time of 30 minutes. The sealant underwent more than 10,000 hours of weathering test in Xenon Arc weatherometer without any observable surface changes taking place.

Example 3

| | Weight, % |
|---|---|
| 1. Silane and aromatic alcohol endcapped polyurethane polymer | 27.12 |
| 2. 1,000 cps. trimethylsiloxy terminated polydimethylsiloxane | 6 |
| 3. Organic plasticizer | 10 |
| 4. White tint paste | 6.5 |
| 5. Coated precipitated calcium carbonate | 40 |
| 6. Coated ground calcium carbonate | 7 |
| 7. Rheology control agent | 0.5 |
| 8. Fume silica | 0.5 |
| 9. UV stabilizer | 0.4 |
| 10. Hexamethyldisilazane | 0.2 |
| 11. Vinyltrimethoxysilane | 1.1 |
| 12. Aminopropyltrimethoxysilane | 0.1 |
| 13. N-ethylaminoisobutyltrimethoxysilane | 0.5 |
| 14. Dibutyltin diacetate | 0.08 |

In this example, about 6% (by weight, based on total polymer) of non-reactive silicone polymer was used to prepare a sealant. The organic polymer comprised a silane and polymer was used to prepare a sealant. The organic polymer comprised a silane and aromatic alcohol endcapped polyurethane polymer. The composition upon curing had a tack free time of 120 minutes accompanied by tooling time of 40 minutes. The sealant did not show any sign of staining on marble.

Example 4

| | Weight, % |
|---|---|
| 1. Silane and aromatic alcohol endcapped polyurethane polymer | 2.82 |
| 2. 20,000 cps. silanol terminated dimethylpolysiloxane | 2.82 |
| 3. Vinylltris-methylethylketoximosilane | 0.19 |
| 4. Polyvinylchloride | 16.45 |
| 5. Organic plasticizer | 19.95 |
| 6. Color tint paste | 2.95 |
| 7. Fungicide | 0.04 |
| 8. UV stabilizer | 0.43 |
| 9. Calcium oxide | 1.90 |
| 10. Calcium carbonate | 18.32 |
| 11. Xylene | 40.77 |
| 12. Mineral Spirits | 4.2 |

-continued

| | Weight, % |
|---|---|
| 13. NCO terminated urethane prepolymer | 26.2 |
| 14. Glycidoxypropyltrimethoxysilane | 0.22 |
| 15. Hardener OZ | 2.43 |
| 16. Dimer acid | 0.31 |

In this example, about 8.9% (by weight, based on total polymer) of silicone polymer, 8.9% of silane and aromatic alcohol endcapped polyurethane polymer (by weight, based on total polymer), and 82.3% of a NCO terminated urethane prepolymer were used to prepare a sealant that did not show phase separation.

The examples included herein are for illustration and are not meant to limit the scope of the invention.

We claim:

1. A curable polymer composition comprising
   (a) about 1-99 wt. %, based on total polymer, of a compatiblizer comprising at least one organic polymer having silane groups, the organic polymer having a molecular weight greater than 1000 g/mole and being a polyurethane, polyether, polyester, polycarbonate, polystyrene, styrene butadiene, polybutadiene, butyl rubber, or mixtures thereof,
   (b) about 1-45 wt. %, based on total polymer, of at least one reactive organopolysiloxane polymer having a molecular weight of about 10,000 to 200,000 g/mole, the reactive organopolysiloxane polymer containing at least one reactive functional group selected from hydroxyl, alkoxy, acyloxy, ketoximo, amino, amido, aminoxy, alkenoxy, alkenyl and enoxy,
   (c) about 0-98 wt. %, based on total polymer, of at least one silane-free organic polymer having a molecular weight greater than 1000 g/mole, and
   (d) optionally, up to about 45 wt. %, based on total polymer, of a non-reactive organopolysiloxane.

2. The composition of claim 1, wherein the reactive organopolysiloxane polymer contains at least one reactive functional group selected from hydroxyl, acyloxy, ketoximo, amino, amino, aminoxy, alkenoxy, alkenyl and enoxy.

3. The composition of claim 2, wherein the reactive organopolysiloxane polymer contains hydroxyl groups.

4. The composition of claim 3, wherein the reactive organopolysiloxane polymer is at least partially end-capped with hydroxyl groups.

5. The composition of claim 3, wherein the reactive organopolysiloxane polymer contains at least one other reactive functional group.

6. The composition of claim 5, wherein the compatiblizer is at least one of a silylated polyurethane, a silylated allyl terminated polyether, a reactive silylated polyol, a polyether with silicone functional groups and mixtures thereof 7. The composition of claim 6, wherein the compatiblizer includes a silylated polyurethane.

8. The composition of claim 7, wherein the polyurethane is end-capped with silane groups and also with alcohol groups.

9. The composition of claim 3, wherein the compatiblizer is at least one of a silylated polyurethane, a silylated allyl terminated polyether, a reactive silylated polyol, a polyether with silicone functional groups and mixtures thereof.

10. The composition of claim 9, wherein the compatiblizer includes a silylated allyl terminated polyether.

11. The composition of claim 9, wherein the compatiblizer includes a reactive silylated polyol.

12. The composition of claim 9, wherein the compatiblizer includes a polyether with silicon functional groups.

13. The composition of claim 9, wherein the compatiblizer includes a polyurethane.

14. The composition of claim 6, wherein the polyurethane is at least partially end-capped with a silane.

15. The composition of claim 14, wherein the polyurethane is end-capped with silane groups and also with alcohol groups.

16. The composition of claim 14, wherein the silane is an aminosilane, a mercaptosilane, the reaction product of a mercaptosilane with a monoepoxide or the reaction product of an epoxysilane with a secondary amine.

17. The composition of claim 14, wherein the silane end-capped polyurethane is prepared by reacting an NCO terminated polyurethane with a silane capping agent to produce a partially silylating polyurethane in which 50% to <100% of the NCO groups are capped with silane and then reacting the partially silylated polyurethane with a non-hindered aromatic or aliphatic alcohol to end-cap any remaining non-silylated NCO groups.

18. The composition of claim 1, wherein the reactive organopolysiloxane polymer is of the formula:

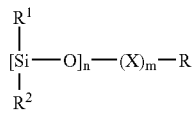

wherein $R^1$ and $R^2$, independently, are an alkyl group having 1 to 8 carbon atoms, or an unsubstituted or substituted aromatic group having 6 to 10 carbon atom, X is a functional group independently selected from substituted or unsubstituted OH, $OR^3$, $N(R^4)_2$, enoxy, acyloxy, oximo, and aminoxy, wherein $R^3$ and $R^4$ are, independently, an alkyl or cycloalkyl having 1 to 8 carbon atoms, "m" is at least two and "n" is a number such that the weight average molecular weight of the reactive organopolysiloxane is from about 10,000 to about 200,000.

19. The composition of claim 18, wherein the reactive organopolysiloxane polymer is of the formula:

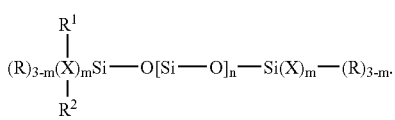

20. The composition of claim 19, wherein each X group is independently selected from:

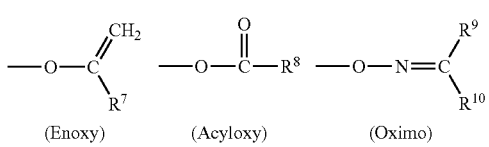

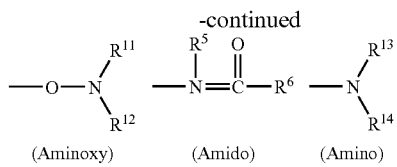

wherein $R^7$ through $R^{14}$ are, independently, an alkyl or cycloalkyl having from about 1 to about 8 carbon atoms.

21. The composition of claim 1, wherein the molecular weight of the organopolysiloxane is about 20,000 to 100,000 g/mole.

22. The composition of claim 1, wherein the composition contains a silane-free polymer selected from polyurethane, polyether, polyester, polycarbonate, polystyrene, styrene butadiene, polybutadiene, butyl rubber, and mixtures thereof.

23. The composition of claim 1, wherein the composition further contains a silicone functional cross-linker in an amount of about 0.2% to 4% by weight, based on the weight of the reactive organopolysiloxane.

24. The composition of claim 1, wherein the composition further contains about 0.01% to 2% (by total weight) catalyst.

25. The composition of claim 1, wherein the composition further contains a plasticizer.

26. The composition of claim 1, wherein the composition further contains about 3% to 60% (by total weight) reinforcement agents, semi-reinforcing agents, or combinations thereof.

27. The composition of claim 1, wherein the composition further contains about 1 to 45 wt. %, based on total polymer, of a non-reactive organopolysiloxane.

28. A curable polymer composition comprising
   (a) about 1-99 wt. %, based on total polymer, of a compatiblizer comprising a polyurethane polymer end-capped with silane groups and also with alcohol groups,
   (b) about 1-45 wt. %, based on total polymer, of at least one reactive organopolysiloxane polymer having a molecular weight of about 10,000 to 200,000 g/mole, the reactive organopolysiloxane polymer being at least partially end-capped with hydroxyl groups, and
   (c) about 0-98 wt. %, based on total polymer, of at least one silane-free organic polymer having a molecular weight greater than 1000 g/mole, and
   (d) optionally, up to about 45 wt. %, based on total polymer, of a non-reactive organopolysiloxane.

29. The composition of claim 28, wherein the silane end-capped polyurethane is prepared by reacting an NCO terminated polyurethane with a silane capping agent to produce a partially silylating polyurethane in which 50% to <100% of the NCO groups are capped with silane and then reacting the partially silylated polyurethane with a non-hindered aromatic or aliphatic alcohol to end-cap any remaining non-silylated NCO groups.

30. The composition of claim 29, wherein the organopolysiloxane polymer is silanol terminated.

31. The composition of claim 30, wherein the molecular weight of the organopolysiloxane is about 20,000 to 100,000 g/mole.

32. The composition of claim 1, wherein the compatiblizer has a molecular weight of greater than about 10,000 g/mole.

33. The composition of claim 28, wherein the polyurethane polymer has a molecular weight of greater than about 10,000 g/mole.

* * * * *

UNITED STATES PATENT AND TRADEMARK OFFICE
CERTIFICATE OF CORRECTION

PATENT NO. : 7,605,203 B2 Page 1 of 1
APPLICATION NO. : 11/138730
DATED : October 20, 2009
INVENTOR(S) : Feng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 613 days.

Signed and Sealed this

Fifth Day of October, 2010

David J. Kappos
*Director of the United States Patent and Trademark Office*